US012151480B2

(12) United States Patent
Albrecht et al.

(10) Patent No.: US 12,151,480 B2
(45) Date of Patent: Nov. 26, 2024

(54) PRINTING DEVICE FOR PRINTING A SURFACE, AND METHOD FOR CHANGING PRINTING INKS IN A PRINTING DEVICE

(71) Applicant: HOMAG GmbH, Schopfloch (DE)

(72) Inventors: Ludwig Albrecht, Dornstetten-Aach (DE); Achim Homeier, Pfalzgrafenweiler (DE)

(73) Assignee: HOMAG GmbH, Schopfloch (DE)

( * ) Notice: Subject to any disclaimer, the term of this patent is extended or adjusted under 35 U.S.C. 154(b) by 166 days.

(21) Appl. No.: 17/793,378

(22) PCT Filed: Jan. 14, 2021

(86) PCT No.: PCT/EP2021/050672
§ 371 (c)(1),
(2) Date: Jul. 15, 2022

(87) PCT Pub. No.: WO2021/144353
PCT Pub. Date: Jul. 22, 2021

(65) Prior Publication Data
US 2023/0059999 A1 Feb. 23, 2023

(30) Foreign Application Priority Data
Jan. 16, 2020 (DE) ..................... 10 2020 100 927.5

(51) Int. Cl.
*B41J 2/17* (2006.01)
*B41J 2/165* (2006.01)
*B41J 3/407* (2006.01)

(52) U.S. Cl.
CPC ......... *B41J 2/1707* (2013.01); *B41J 2/16552* (2013.01); *B41J 2/1742* (2024.05); *B41J 3/407* (2013.01)

(58) Field of Classification Search
CPC ...... B41J 2/1707; B41J 2/16552; B41J 3/407; B41J 2002/1742; B41J 2/211; B41J 2/1721
See application file for complete search history.

(56) References Cited

U.S. PATENT DOCUMENTS 7,347,540 B2 * 3/2008 Piock ...................... B41J 2/175 347/85
2004/0070651 A1 4/2004 Usui et al.
(Continued)

FOREIGN PATENT DOCUMENTS

DE 3932462 A1 4/1991
DE 102014118168 A1 6/2016
(Continued)

OTHER PUBLICATIONS

International Search Report for International Application No. PCT/EP2021/050672, mailed Mar. 29, 2021, 5 pages including translation.

*Primary Examiner* — Sharon Polk
(74) *Attorney, Agent, or Firm* — Morgan, Lewis & Bockius LLP

(57) ABSTRACT

A printing device can be used to print on a surface of a workpiece made at least partly of wood, a wood material, synthetic material, composite material or the like. The printing device can include an ink supply device holding a printing ink and an ink feed system by means of which the printing ink can be supplied to a print head in order to carry out a printing process The device can also include a flushing device that can flush the ink feed system or the print head with a flushing liquid for a printing ink change.

13 Claims, 2 Drawing Sheets

(56) References Cited

U.S. PATENT DOCUMENTS

| | | | |
|---|---|---|---|
| 2008/0218564 | A1 | 9/2008 | Kubo |
| 2010/0079539 | A1 | 4/2010 | Inoue |

FOREIGN PATENT DOCUMENTS

| | | | | |
|---|---|---|---|---|
| EP | 1013437 | A1 | | 6/2000 |
| EP | 3196029 | A1 | | 7/2017 |
| JP | 2002192710 | A | | 7/2002 |
| JP | 2013072145 | A | * | 4/2013 |

* cited by examiner

PRINTING DEVICE FOR PRINTING A SURFACE, AND METHOD FOR CHANGING PRINTING INKS IN A PRINTING DEVICE

TECHNICAL FIELD

The invention relates to a printing device and to a method for changing printing inks in a printing device.

PRIOR ART

Workpieces, in particular wooden workpieces, the surface of which is provided with a coating material, can for visual reasons be provided with graphical patterns, images or decorative finishes, such as reproductions of woodgrains or stone reproductions for example. These can be printed onto the surface of the workpieces using a printing device, wherein printing devices that allow for a multicolor printing process, for example four-color (CMYK), six-color (CMYK/light magenta/light key) or eight-color printing, can be used for this purpose. In such a multicolor printing process, a defined color space can b e mapped by means of a halftone process based on subtractive color mixing, wherein a specific color tone is approximated by individual printed dots formed by the various printing inks. This multicolor printing process is of only limited suitability for printing single colors, for example a dark green, ocher or a light orange since the halftone process means that the various printing inks of the individual printed dots can be seen with the naked eye. Therefore, in order to print single colors, printing devices can have additional spot colors, wherein each spot color requires its own print head, however. Providing a plurality of different spot colors thus requires a large installation space and a complex control system.

DESCRIPTION OF THE INVENTION

The present invention addresses the problem of proposing a printing device which allows for a rapid printing ink change and has a compact design. The invention also addresses the problem of proposing a method of changing printing inks in a printing device that allows for a simple and rapid printing ink change.

This problem is solved by means of a printing device for printing a surface, in particular the surface of a workpiece, according to the preamble of claim 1, wherein a flushing device is provided, by means of which at least the ink feed system and/or the at least one print head can be flushed with a flushing liquid for a printing ink change. Using such a printing device, a printing process can be carried out with at least one replaceable printing ink. Since at least the ink feed system and/or the at least one print head can b e flushed with the flushing liquid before a printing ink change or between two printing processes, residual printing ink from a previous printing process remaining in the ink feed system and/or in the print head can be removed, so that this residual printing ink does not influence the color of a subsequent printing process with a different printing ink. In this way, a simple and rapid cleaning process can be provided, by means of which both the print speed and the print quality when printing with different printing inks can be improved.

In a preferred development of the printing device, the ink supply device can have multiple ink containers, the ink containers holding base colors and/or intermediate colors for a multicolor printing process, and at least one further ink container, which holds at least one spot color for a single-color printing process. In this way, in addition to the base colors, at least one additional spot color can be integrated into the printing device for multicolor printing, in particular a digital printing device for carrying out a four-color (CMYK; cyan, magenta, yellow, key), six-color (CMYK/light magenta/light key) or eight-color printing process. In this way, as well as achieving a high-quality printed image when printing a single color tone, there is also the possibility of printing a color tone which cannot be mapped by multi-color printing. In particular, a plurality of additional ink containers with various spot colors for carrying out single-color printing processes are provided in the printing device.

In a development of the printing device, it can be provided that the flushing device comprises a flushing liquid reserve containing a flushing liquid, and that the flushing liquid can be supplied to the ink supply device via a flushing line. A compact integration of the flushing device into the printing device can be provided in this way. Since the flushing device can be connected directly to the ink supply devices via the flushing line, a simple activation of the flushing process is also possible.

In a further embodiment of the printing device, the ink supply device and the flushing device can have a common valve device, by means of which the printing inks or the flushing liquid can be supplied to the ink feed system and/or to the at least one print head. Such a common valve device enables the flushing process and the printing process to be easily controlled. With the appropriate valve control, the ink feed system and the at least one print head can be supplied either with one or more defined printing inks or with the flushing liquid in order to carry out the flushing process.

A preferred embodiment of the printing device can provide that a collecting device can be allocated to the at least one print head, and the flushing liquid and/or the printing ink can be supplied via the at least one print head to the collecting device. It can b e provided in particular that the at least one print head can be positioned relative to the collecting device or that the collecting device can be positioned relative to the at least one print head in such a way that the flushing liquid and/or the printing ink can be received by the collecting device during the flushing process. In order to dispose of the flushing liquid and/or printing ink, the collecting device comprises in particular a reservoir, but it can also have a discharge line.

In a particularly preferred embodiment of the printing device, it can b e provided that a color measuring device, preferably a sensor unit or a camera unit, is allocated to the collecting device and/or to the at least one print head, and a color value of the flushing liquid and/or of the printing ink can be detected by the color measuring device. Such a color measuring device enables the flushing process to be assessed, by using the detected color value to determine a residual proportion of printing ink in the flushing liquid or a residual proportion of flushing liquid in the printing ink. Alternatively or in addition, a determination of the color value of the flushing liquid and/or of the printing ink can also be provided by means of a visual inspection process by an operator.

In an advantageous development of the printing device, the color measuring device can be connected to a printer control unit and the flushing process and/or the printing process can be controlled by the printer control unit, depending on the detected color value of the flushing liquid or the printing ink. In this way, an automated control system for changing the printing inks can be established, which regulates the flushing process and/or printing process depending on the detected color value.

Moreover, an embodiment of the printing device can provide that a common feed pump for transporting the printing inks and for transporting the flushing liquid is provided and that a delivery rate of the feed pump is preferably adjustable. The common feed pump enables the number of components to be reduced, resulting in both a smaller installation space and lower operating and component costs. In particular, the delivery rate of the feed pump can be adjusted by the printer control unit. The delivery rate of the feed pump can b e adapted to a volume to be flushed, enabling ink change times to be individually adjusted. For example, the delivery rate of the feed pump can be adjusted by the printer control unit depending on the detected color value.

In a development of the printing device, a common print head can be provided for the multicolor printing process and for the single-color printing process. In this way a single print head can be used for both printing processes, resulting in a further reduction in components and hence in the operating and component costs. In an alternative development, it can additionally be provided that at least two separate print heads are provided for the multicolor printing process and for the single-color printing process. Such a separation of the multicolor printing process and single-color printing process can increase the ink change speed and hence the print speed.

An embodiment of the printing device can provide that the at least one print head and/or the ink feed system are designed to carry out a side-shooter printing process or an end-shooter printing process. In these printing methods, the printing ink in the print head is passed through a piezo element, which undergoes a deformation under the application of an electric voltage, causing the printing ink to be mechanically expelled from the print head. If the printing ink is expelled from the print head by the piezo element in the flow direction, this is known as the end-shooter printing principle. If the printing ink is expelled from the print head by the piezo element perpendicularly to the flow direction through a side outlet opening in the piezo element, this is known as the side-shooter printing principle.

In addition, the problem is solved by a method for changing printing inks in a printing device, in particular a printing device according to one of the previously described embodiments, wherein for a printing ink change a printer control unit activates a flushing device to carry out a flushing process in which at least one ink feed system and/or a print head of the printing device are flushed at least in some regions with a flushing liquid. This method allows for a simple and rapid change of printing inks in the printing device, wherein at least the ink feed system and/or the at least one print head is flushed with the flushing liquid before the printing ink change or between two printing processes. Ink residues from a previous printing process can be removed from the ink feed system and/or from the at least one print head in this way, so that a different printing ink, in particular a printing ink of a different color tone, can be supplied to the ink feed system and/or to the print head for a subsequent printing process.

An advantageous development of the method can provide that, in order to carry out the flushing process, a valve device is activated by the printer control unit and a fluid connection is established between the flushing device and an ink feed system of the printing device, wherein the flushing liquid and a printing ink present in the ink feed system and/or in the print head are discharged via the print head and are preferably supplied to a collecting device. Since the flushing device can easily be integrated into the ink feed system by mean s of a corresponding activation of the valve device, a simple control of the flushing process can be achieved in this way.

A further advantageous development of the method can provide that, in order to carry out a printing process, the valve device is activated by the printer control unit and a fluid connection is established between at least one ink container holding a printing ink and the ink feed system and the printing ink is supplied to the ink feed system and/or to the print head, wherein the printing ink and the flushing liquid present in the ink feed system and/or in the print head due to the flushing process are discharged via the print head and are preferably supplied to a collecting device. The flushing liquid from the flushing process remaining in the ink feed system and/or in the print head can be removed for the printing process in this way. To this end, printing ink is supplied to the ink feed system and/or to the print head until there is no more flushing liquid in the ink feed system and/or in the print head.

In a further embodiment of the method, a color value of the flushing liquid and/or of the printing ink can be detected by a color measuring device or by means of a visual inspection process, in order to determine a proportion of residual printing ink in the flushing liquid or a proportion of residual flushing liquid in the printing ink. The color value can b e detected continuously or at intervals. The flushing process and/or the printing process can b e monitored in this way, wherein, depending on the color value of the flushing liquid, the progress of the flushing process can be assessed. Similarly, the residual proportion of flushing liquid in the printing ink can be determined from the color value, and this can be used to assess whether there is already only printing ink in the ink feed system and/or in the print head, in order to be able to carry out the printing process.

A particularly preferred embodiment of the method can provide that the flushing process and/or the printing process is controlled by the printer control unit depending on the detected color value. The detected color value can be transmitted to the printer control unit to control the flushing process and/or printing process. In this way, an automated method for changing the printing inks can be established in which the flushing process and/or printing process can be controlled depending on the detected color value.

The invention and further advantageous embodiments and developments thereof are described in more detail and explained hereinafter by way of the examples illustrated in the drawings. The features to be found in the description and drawings can be applied in accordance with the invention either individually in their own right or in groups in any combination.

DETAILED DESCRIPTION OF PREFERRED EMBODIMENTS

Figure 1:
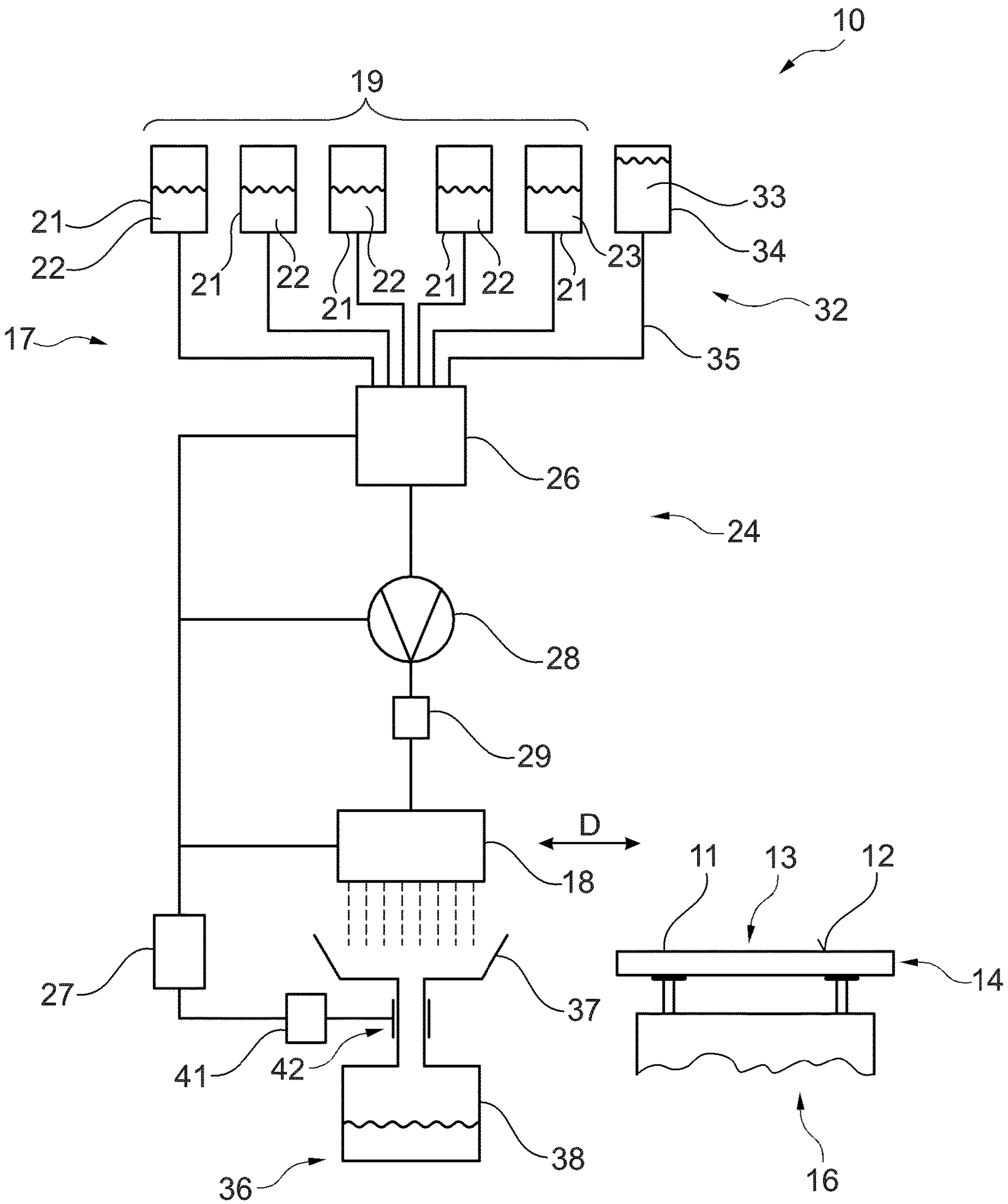
FIG. 1 shows a schematic view of a printing device.

FIG. 1 shows a schematic view of a printing device 10. This printing device 10 is intended for printing workpieces 11, in particular workpieces 11 made at least partly of wood, a wood material, synthetic material, composite material or the like. The printing device 10 is designed in particular as a digital printing device, with which a multicolor printing process and/or a single-color printing process can be carried out. The multicolor printing process can be carried out as a halftone printing process and the single-color printing process as a self-color printing process. Such a printing device 10 can be used to print both multicolored patterns, images or decorative finishes and single-color tones onto a surface 12 of the workpiece 11.

The surfaces 12 of the workpiece 11 can in particular be provided with a coating material, which is printed on by the printing device 10. Both large faces 13 and narrow faces 14 of the workpiece 11 can be printed on with the printing device 10. To this end, the printing device 10 and/or the workpiece 11 can be designed to be movable relative to one another in a direction of motion D or in multiple directions of motion. For example, for the purposes of the printing process the workpiece 11 can be placed on a schematically indicated conveyor device 16 or holder, and/or the printing device 10 can be arranged on a movable bracket.

The printing device 10 comprises an ink supply device 17, which supplies printing inks 19 to a print head 18 for the printing process. The ink supply device 17 has a plurality of ink containers 21, each of which holds a printing ink 19. For the multicolor printing process, four ink containers 21 for holding four base colors 22 are provided. This multicolor printing process is thus a four-color printing process with the four base colors 22 cyan, magenta, yellow, and black (CMYK). As an alternative to this four-color printing process, the printing device 10 can also have additional ink containers 21 with supplementary base colors 22, so as to carry out a six-color (CMYK/light magenta/light key) or eight-color printing process, for example. Similarly, further ink containers 21 with additional intermediate or dominant colors for the multicolor printing process can be provided. In addition to the ink containers 21 holding the base colors 22, a further ink container 21 is provided which holds a spot color 23 for a single-color printing process. This spot color 23 is intended for carrying out a single-color printing process, i.e. for printing a defined single color tone. Therefore, this defined color tone is not reproduced by multicolor printing using a halftone process but rather exclusively through the use of the spot color 23. In addition, further ink containers 21 for holding various further spot colors 23 can also be provided, such that single-color printing processes can be carried out with different color tones.

The printing inks 19 are supplied to the print head 18 via an ink feed system 24. The ink feed system 24 comprises a valve device 26, with which the individual ink containers 21 are in fluid connection. The valve device 26 can be activated by a printer control unit 27, such that the individual base colors 22 for the multicolor printing process or the spot color 23 for the single-color printing process can be supplied to the print head 18 in response to a corresponding activation. The valve device 26 can be designed as a multiport control valve. A common feed pump 28, which can be activated by the printer control unit 27, is provided for transporting the printing inks 19. The ink feed system 24 can have an additional vent valve 29 and/or filter element 31. In the schematic representation of the printing device 10 in FIG. 1, a common print head 18 is provided for the multicolor printing process and for the single-color printing process. It can also be provided that separate print heads 18, preferably two separate print heads 18, are provided for the multicolor printing process and the single-color printing process.

In order to carry out printing processes with different printing inks 19, the printing inks 19 in the ink feed system 24 and in the print head 19 have to be changed. To avoid the risk of a negative color influence during a printing process due to residual printing ink 19 in the ink feed system 24 and the print head 18 from a previous printing process, the printing ink 19 in the ink feed system 24 and in the print head 18 has to be removed.

For the purposes of such a printing ink change, the printing device 10 has a flushing device 32, by means of which a flushing process can be carried out to flush the ink feed system 24 and the print head 18. Here, the ink feed system 24 and the print head 18 are flushed with a flushing liquid 33 in order to change the printing ink 19. The flushing device 32 comprises a flushing liquid reserve 34, which holds the flushing liquid 33. This flushing liquid reserve 34 can be designed in an equivalent manner to the ink containers 21 and can be integrated into the printing device 10. The flushing liquid reserve 34 is connected to the valve device 26 via a flushing line 35 to enable a fluid connection to be established between the flushing device 32 and the ink feed system 24 in response to a corresponding activation of the valve device 26 by the printer control unit 27.

To carry out the flushing process, the flushing liquid 33 is transported by the feed pump 28 and is flushed in this way through the ink feed system 24 and the print head 18. The printing ink 19 or residues of the printing ink 19 from a previous printing process that are present in the ink feed system 24 and the print head 18 are flushed out in this way. The flushing liquid 33 can contain ink-dissolving additives, for example solvents, which increase the effectiveness of the flushing process. The flushing liquid 33 and the printing ink 19 or ink residues of the printing ink 19 are flushed out through the print head 18 and supplied to a collecting device 36. This collecting device 36 can be positioned relative to the print head 18 or the print head 18 can be positioned relative to the collecting device 36 in order to receive the flushing liquid 33 and the printing ink 19. To this end, the collecting device 36 comprises a collecting element 37, such as a funnel, which is allocated to the print head 18, and an adjoining reservoir 38 for receiving the flushing liquid 33 and printing ink 19.

The collecting device 36 has a color measuring device 41 with which a color value of the flushing liquid 33 and/or of the printing ink 19 can be detected. This color measuring device 41 can have a color sensor 42 or a camera unit. The color measuring device 41 enables a residual proportion of printing ink 19 in the flushing liquid 33 to be detected, so that the flushing process can be controlled depending on the detected color value. The flushing process is thus continued until only a defined threshold amount of printing ink 19 is still present in the flushing liquid 33 and mostly only the flushing liquid 33 is discharged through the print head 18. In particular, the color measuring device 41 is connected to the printer control unit 27, so that the flushing process can be controlled by the printer control unit 27 depending on the detected color value of the flushing liquid 33 or of the printing ink 19. The valve device 26 and the feed pump 28 can be activated accordingly by the printer control unit 20 for this purpose.

As an alternative to the color measuring device 41, the proportion of printing ink 19 in the flushing liquid 33 can also be determined by means of a visual inspection process, for example by a user of the printing device 10, wherein the control of the flushing process and/or of the printing process is manually regulated by the user.

When a defined residual proportion of printing ink 19 in the flushing liquid 3 3 is reached, i.e. when there is no longer a significant proportion of printing ink 19 in the flushing liquid 33, the ink feed system 24 and the print head 18 are sufficiently or completely flushed, and so the flushing process with the flushing liquid 33 is terminated. The valve device 26 is then activated by the printer control unit 27, the fluid connection between the flushing device 32 and the valve device 26 is disconnected, and a fluid connection is established between one of the ink containers 21, in particular an ink container 21 with a different printing ink 19, for example the spot color 23, and the valve device 26. To remove the remaining flushing liquid 33 from the flushing process from the ink feed system 24 and the print head 19, the ink feed system 24 and the print head 18 are flushed with the printing ink 19 until only a defined residual proportion of flushing liquid 33 is still present in the printing ink 19 and mostly only the printing ink 19 is discharged through the print head 18, and the printing process, for example the single-color printing process, can be carried out.

The flushing process can be controlled depending on a color difference between the printing inks 19 to be changed. It can be provided that the flushing process with the flushing liquid 33 is omitted if there is a small color difference between the printing inks 19 to be changed. The degree of color difference between the printing inks 19 can b e stored in the printer control unit 27 or detected by the color measuring device 41. If the degree of color difference is small, the printer control unit 27 can activate the valve device 26 in such a way that the substitute printing ink 10 is supplied directly to the ink feed system 24 and the print head 18 and the flushing process is carried out with the substitute printing ink 10 rather than with the flushing liquid 33.

The delivery rate of the feed pump 28 can be adapted for the flushing process. In particular, the delivery rate of the feed pump 28 can be adjusted by the printer control unit 27. The delivery rate of the feed pump 28 can thus be adapted to a volume of the ink feed system 24 and the print head 18 to be flushed, so that an ink change time can be individually adapted in this way. In particular, it is provided that the delivery rate of the feed pump 28 is adjusted by the printer control unit 27 depending on the detected color value.

In the printing device 10 shown in FIG. 1, the print head 18 and the ink feed system 24 are designed in accordance with an end-shooter printing principle. For this printing principle, a number of piezo elements (not shown in detail) provided in the print head 18 expel the printing ink 19 from the print head 18 in order to print the surface 12. With the end-shooter printing principle, the printing ink 19 in the print head 18 is supplied to the piezo elements, wherein the piezo elements undergo a deformation under the application of an electric voltage, and the printing ink 19 is expelled from the print head 18 in the flow direction as a consequence of the generated force.

Figure 2:
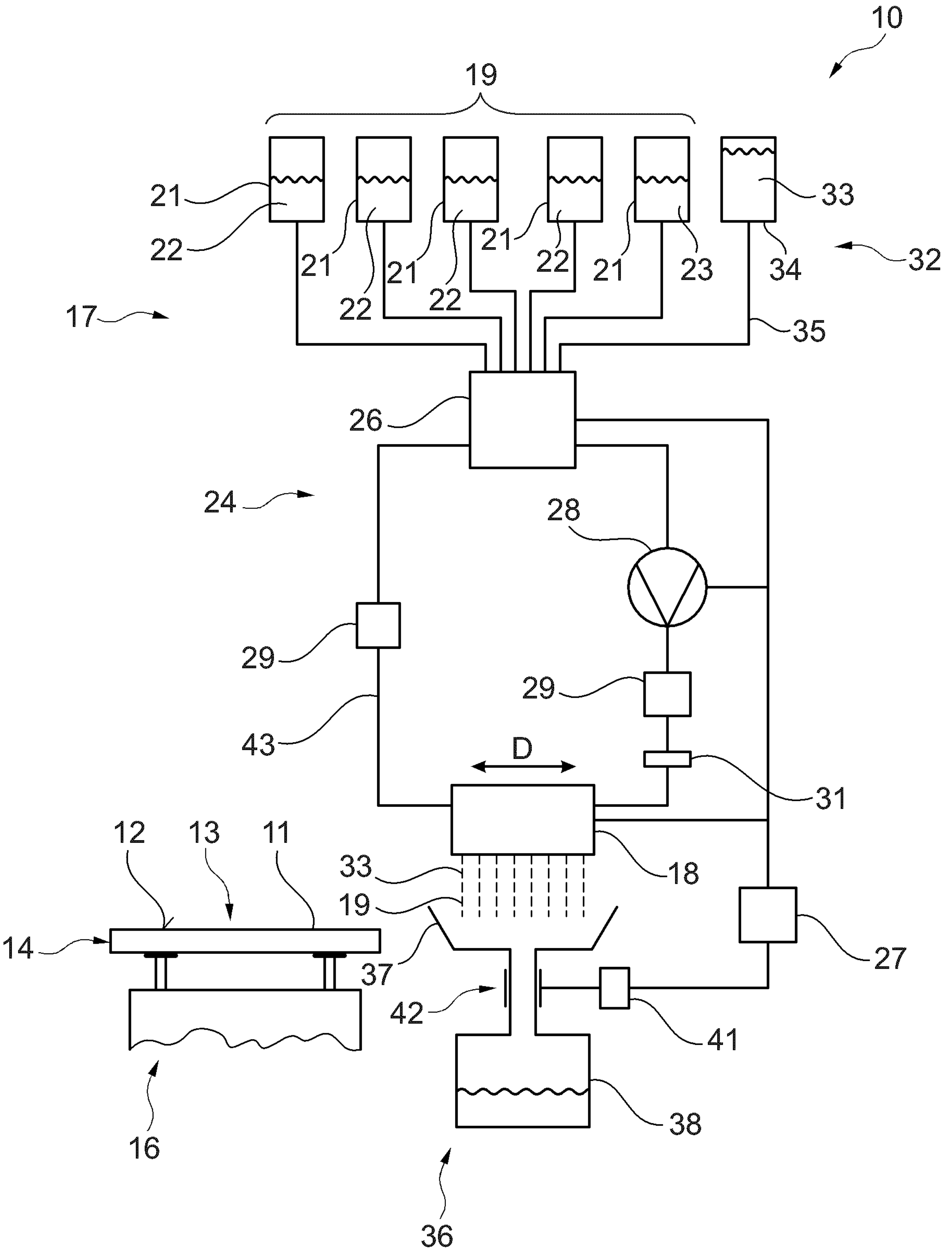
FIG. 2 shows an alternative embodiment of the printing device according to FIG. 1.

FIG. 2 shows an alternative embodiment of the printing device 10, wherein the basic design, in particular the possibility of the flushing process, corresponds to the printing device shown in FIG. 1. In this printing device 10, the print head 18 and the ink feed system 24 are designed in accordance with a side-shooter printing principle, however. Here, the ink feed system 24 between the valve device 26 and the print head 18 is designed as a circulation line 43, such that the printing ink 19 can circulate in the ink feed system 24. With the side-shooter printing principle, the piezo elements in the print head 18 are oriented perpendicularly to the discharge direction of the printing ink 19, i.e. the printing ink 19 is supplied to the piezo elements and is expelled from the print head 18 through a side outlet opening perpendicularly to the flow direction of the printing ink 19.

The invention claimed is:

1. A printing device for printing a surface of a workpiece comprising wood, a wood material, synthetic material, or composite material, the printing device comprising:

an ink supply device which has at least one ink container holding a printing ink;

an ink feed system by means of which the printing ink can be supplied print head, in order to carry out a printing process with the printing ink (19);

a flushing device, by means of which at least the ink feed system or the at least one print head can be flushed with a flushing liquid for a printing ink change; and a color measuring device configured to detect a color value of the flushing liquid or of the printing ink, the color measuring device being connected to a printer control unit that is configured to control an operation of the flushing device or the ink feed system based on the detected color value of the flushing liquid or of the printing ink.

2. The printing device according to claim 1, characterized in that the ink supply device has multiple ink containers, which hold base colors or intermediate colors for a multicolor printing process, and at least one further ink container, which holds at least one spot color for a single-color printing process.

3. The printing device according to claim 1, characterized in that the flushing device comprises a flushing liquid reserve with a flushing liquid and the flushing liquid can be supplied via a flushing line to the ink supply device.

4. The printing device according to claim 1, characterized in that the ink supply device and the flushing device have a common valve device by which the printing ink or the flushing liquid can be supplied to the ink feed system or to the at least one print head.

5. The printing device according to claim 1, further comprising a collecting device allocated to the at least one print head, and the flushing liquid or the printing ink can be supplied to the collecting device via the at least one print head.

6. The printing device according to claim 1, wherein the color measuring device is allocated to the collecting device or to the at least one print head.

7. The printing device according to claim 1, further comprising a common feed pump to transport the printing ink and to transport the flushing liquid, and a delivery rate of the feed pump is adjustable.

8. The printing device according to claim 1, further comprising a common print head for the multicolor printing process and for the single-color printing process, or at least two separate print heads for the multicolor printing process and for the single-color printing process.

9. The printing device according to claim 1, characterized in that the at least one print head or the ink feed system are designed to carry out a side-shooter printing process or to carry out an end-shooter printing process.

10. A method for changing printing inks in a printing device according to claim 1, wherein for the printing ink change a printer control unit activates a flushing device to carry out a flushing process in which at least one ink feed system or a print head of the printing device are flushed at least in some regions with a flushing liquid, and wherein a color value of the flushing liquid or of the printing ink is detected by a color measuring device or by means of a visual inspection process, in order to determine a residual proportion of printing ink in the flushing liquid or a residual proportion of flushing liquid in the printing ink.

11. The method according to claim 10, characterized in that a valve device is activated by the printer control unit and a fluid connection is established between the flushing device and an ink feed system of the printing device, wherein the flushing liquid and a printing ink present in the ink feed system or in the print head are discharged via the print head and are supplied to a collecting device.

12. The method according to claim 11, characterized in that the valve device is activated by the printer control unit and a fluid connection is established between at least one ink container holding a printing ink and the ink feed system and the printing ink is supplied to the ink feed system or to the print head, wherein the printing ink and the flushing liquid present in the ink feed system or in the print head due to the flushing process are discharged via the print head and are preferably supplied to a collecting device.

13. The method according to claim 10, characterized in that the flushing process or the printing process is controlled by the printer control unit depending on the detected color value.

* * * * *